June 29, 1965  M. U. BAGWELL  3,191,613
TWO-WAY CHECK VALVE COMBINATION
Filed July 26, 1962  3 Sheets-Sheet 3
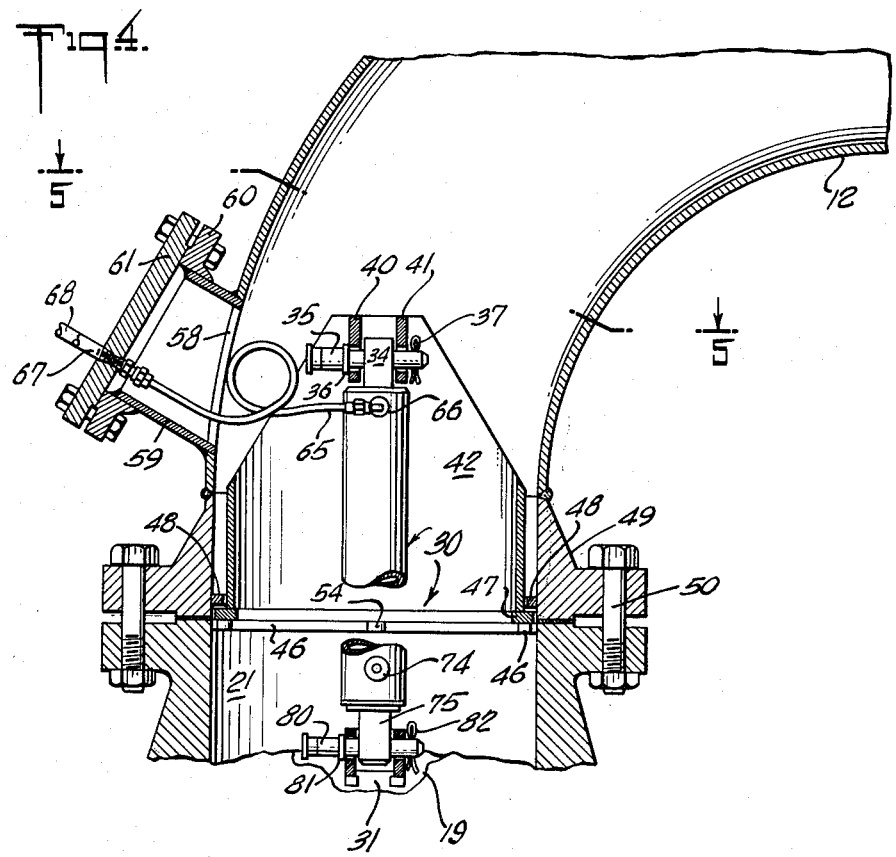
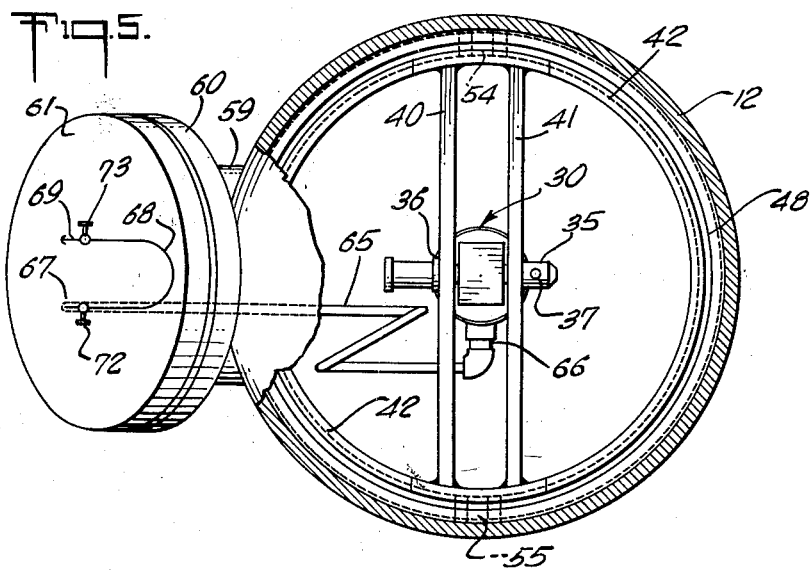

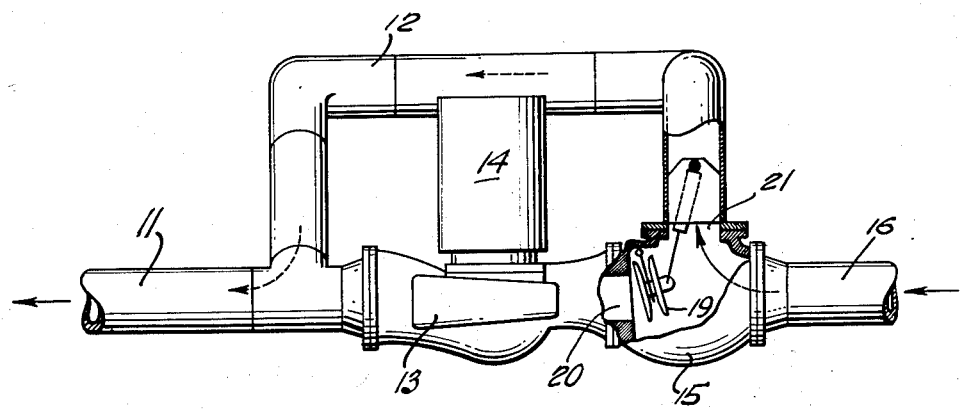
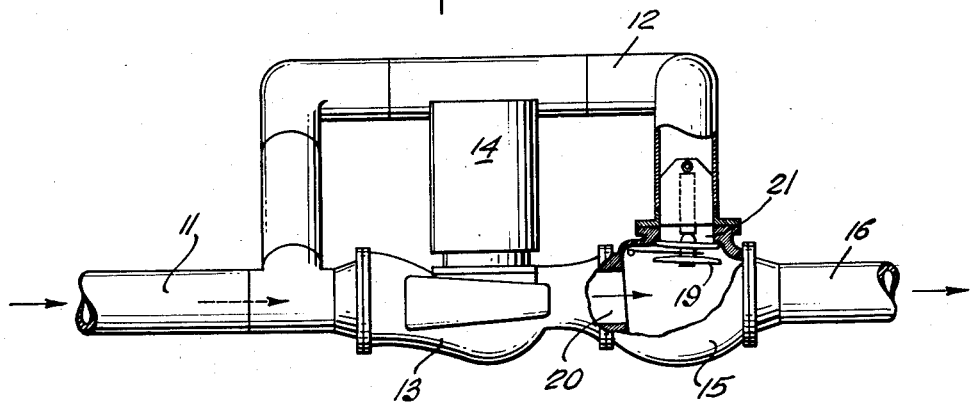

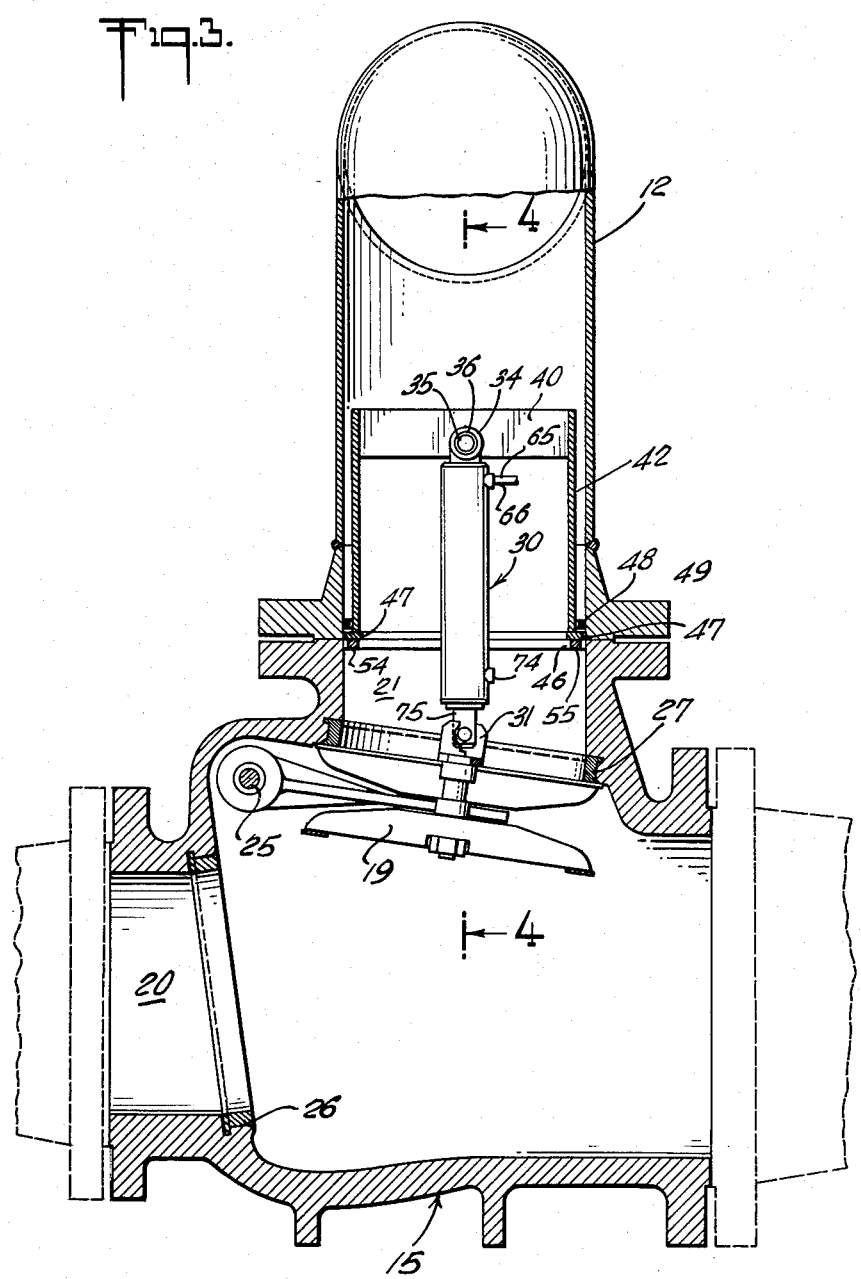

United States Patent Office 3,191,613
Patented June 29, 1965

3,191,613
TWO-WAY CHECK VALVE COMBINATION
Marshall U. Bagwell, Houston, Tex., assignor to The Texas Pipe Line Company, Houston, Tex., a corporation of Texas
Filed July 26, 1962, Ser. No. 212,625
5 Claims. (Cl. 137—110)

This invention concerns an improved two-way check valve. More specifically, it concerns a two-way check valve incorporating therewith an operation damper for avoiding destructive action thereof.

The invention is particularly applicable to pipe line operations where large size equipment is employed, and the specific invention is concerned with an improved two-way check valve combination.

Heretofore in the pipe line industry, two-way or double swing check valves have been used to control the direction of flow of fluids in two connecting pipe lines. An illustration of such use is a flow line connected to a storage tank with a motor operated booster pump therein for the drainage flow from the tank. During the reverse or filling fluid flow there is a bypass connection around the pump in order to avoid the loss involved in the tendency to drive the booster pump in reverse. In such an installation a two-way check valve is used to automatically connect only the bypass line alone or the booster pump alone while cutting off the bypass line. However, in such an arrangement it was found that the check valve would operate with severe slamming of the valve as it seated in either of its two positions. This was sufficient to cause great noise and vibration accompanied by eventual damage and failure. One attempt to overcome such difficulty involved the use of a lever and weight or other arrangement for applying snubbing action to an external extension of the pivot shaft to which the clapper of the valve was attached. This attempt failed, however, in that the forces involved caused a shearing of the clapper shaft, or of pins holding the external lever or other structure.

Consequently it is an object of this invention to provide for an improved combination whereby a two-way valve is constructed with a double acting dampener arrangement that is connected directly to the body of the clapper of a two-way check valve.

Another object of the invention is to provide an improved two-way check valve structure including damper means that is incorporated within the bodily structure of the valve in such a manner as to be able to withstand the high forces involved in snubbing the action of such a valve.

Briefly, the invention may be described as being an improvement that is related to a combination with a two-way check valve for use in large quantity fluid flow applications. Such a check valve operates to automatically close one of two ports in said valve. The said valve has a pivotally mounted clapper for closing the ports. The combination also comprises a double acting damper means that is connected directly to the body of said clapper for retarding the speed of closing of said ports.

Again briefly, the invention relates to a combination with a two-way check valve for use in large quantity fluid flow to alternately close one of two ports in said valve. The said valve has a pivotally mounted clapper for closing said ports and includes damper means which comprises a cylinder and piston that is located at least partly within the body of the valve. The said cylinder and piston is pivotally attached to the body of the clapper at one end of the unit and further includes an internal support means carried by said valve structure, for having the other end of said cylinder and piston unit pivotally attached thereto. The said internal support means comprises a removable sleeve element having means thereon for supporting said one end of the cylinder and piston unit.

The foregoing and other objects and benefits of the invention are set forth below in more detail, in connection with the description which follows and which is illustrated in the drawings in which:

FIGURE 1 is a schematic showing of a fluid flow arrangement in which a valve according to the invention is employed;

FIGURE 2 is a similar schematic showing of the same system illustrated in FIGURE 1 but with the internal two-way check valve structure being illustrated in substantially the opposite position from that shown in FIGURE 1;

FIGURE 3 is a longitudinal cross section view, shown enlarged relative to the FIGURES 1 and 2 illustrations and illustrating in greater detail a preferred modification according to the invention;

FIGURE 4 is a somewhat more enlarged cross section view taken along the lines 4—4 of FIGURE 3 and looking in the direction of the arrows; and FIGURE 5 is a plan view partly in cross section, taken along the lines 5—5 of FIGURE 4.

Referring to FIGURES 1 and 2, it is pointed out that there is illustrated a pipeline type of application for a valve that is constructed in accordance with this invention. In this application, fluid flow is directed in reverse directions through the system depending upon whether a storage tank or the like (not shown but which may be connected to the system) is being filled or drained. Thus in the illustrated showings of FIGURES 1 and 2 there is a main flow-path pipe 11 that has connected near one end thereof a bypass loop 12 and the input side of a pump 13. The pump is driven by a motor 14. When it is in operation, pump 13 discharges into one of two alternatively closed ports of a two-way check valve 15. The bypass loop 12 is connected to the other of the two alternate ports of the valve 15. A third port or flow path opening of the valve 15 is connected to another main flow-path pipe 16.

The operation of this system as illustrated in FIGURES 1 and 2, is indicated by the arrows showing the direction of fluid flow, and such operation may be briefly reviewed as follows. Internally of the valve 15 there is a pivoted clapper 19 which tends to take up a vertical position generally, as illustrated in FIGURE 1. This takes place under gravity forces since the valve 15 is mounted with its orientation as shown in FIGURES 1 and 2 (insofar as the vertical orientation thereof is concerned). Consequently under conditions of flow as illustrated in FIGURE 1, the fluid tends to close the clapper 19 against its seat which surrounds a port 20 that is connected to the outlet side of the pump 13. Since this port is then closed the fluid is directed into the bypass loop 12 via alternative port 21 of the valve 15 so long as the fluid flow continues in the indicated direction.

Under the reverse conditions, i.e. when the source of fluid (e.g. a tank mentioned above) is being drained while employing the booster action of the pump 13, the fluid flow takes the path indicated by the arrows in FIGURE 2. Under these conditions the clapper 19 of the valve 15 will be forced off of its seat in conjunction with port 20 and will be seated firmly against the seat associated with the other port 21. This means that the bypass loop 12 will be cut off and consequently no recirculation of fluid through the pump 13 will take place, but rather all of the fluid will be directed through from the pipe 11 via the pump 13 and the valve 15 to the other main flow-path pipe 16.

Thus, it will be observed that the action of a two-way check valve is automatic and takes place by reason of the fluid flow that is being directed through the valve. However, as pointed out above, it has been found that a two-way check valve used in an application such as that illustrated and just described above, tends to be actuated so forceably as to cause very high and destructive stresses in the valve and surrounding elements of the pipe line ssytem. In overcoming the difficulties thus created, a valve in combination with a damper structure all of improved quality has been provided in accordance with the subject invention. The details of this structure are shown in FIGURES 3–5 and will be described below.

Referring to FIGURES 3, 4 and 5 it is pointed out that the main body of the valve 15 incorporates alternative ports 20 and 21 which were mentioned above in connection with the system showings. The clapper 19 is pivoted on a shaft 25 for permitting actuation from the position illustrated in FIGURE 3 to the alternative position against a seating ring 26 that is mounted within the body of the valve 15, surrounding the port 20. Similarly there is a valve seat ring 27 which is mounted in the body structure of the valve 15 surrounding the inside end of the other port 21.

In order to damp the action of the clapper 19 so as to reduce the speed and high destructive force involved in the closing of this clapper against either of its valve seat rings 27 or 26, there is a cylinder and piston unit 30 that is mounted with one end pivoted to a clevis type bracket 31 that is in turn fastened securely to the central structure of the clapper 19 in any feasible manner, e.g. by welding as illustrated in FIGURES 3 and 4. The other end of the cylinder and piston unit 30 is also pivotally mounted in some feasible manner, e.g. that shown which employs in conjunction with an end lug 34 of the cylinder unit, a shaft 35 that may take the form of a pin as shown in FIGURE 4. This pin 35 is removable and includes a stop collar 36 as well as a transverse hole to accommodate a cotter pin 37 as illustrated. This pin or shaft 35 is placed through a pair of aligned holes in cross supports 40 and 41. These support plates 40 and 41 are attached securely at the ends thereof to the opposite sides of the free end of a removable sleeve 42. It will be observed in FIGURE 4 that the upper end of the sleeve 42 (as viewed in FIGURES 3 and 4) is shaped by having sloped sides on the two opposite sides thereof 90° away from the sides where each of the ends of cross supports 40 and 41 are attached to the sleeve.

The support sleeve element 42 is a structural entity and is arranged for being mounted within the fluid path through the valve 15. This results in the strength of the dampener being greatly enhanced by employing a direct connection centrally of the clapper. Although various arrangements might be provided for mounting the supporting sleeve element 42 it is preferred to employ structure like that illustrated, whereby the sleeve is removable upon disconnection of the flow pipes involved in the bypass loop 12. This structure involves the use of a support ring 46 that is securely attached to the body of the valve 15 at the external end of the port 21, in any feasible manner such as by welding (as illustrated). Ring 46 then acts to be the lower support for a flange 47 that is securely attached to the lower end of the sleeve 42, preferably by welding. Located just above the flange 47 (as the sleeve is mounted) there is a second support or clamping ring 48. This ring is securely attached to the end, i.e. flange portion 49 of the bypass piping 12, in any feasible manner such as by being welded thereto. It will be observed that when the bypass piping 12 is fastened in place over the port 21 of the valve 15 by means of the usual bolts 50 shown, the clamping ring 48 acts to securely hold the flange 47 of the sleeve 42 between it and the lower support ring 46.

In order to avoid any rotation of the sleeve 42 about its axis (which might cause binding at the pivotal connections of the cylinder and piston unit 30) there is employed a pair of lugs 54 and 55 that are attached at diametrically opposite locations on the lower side of the flange 47. These lugs 54 and 55 fit into spaces that are left in the lower support ring 46 at diametrically opposite points thereon as may be observed in the dashed line showing of FIGURE 5.

In order to provide access for repairs and the like in connection with the cylinder and piston unit 30, there is a hand hole 58 (FIGURE 4) in the side of the bypass piping 12. So as to maintain this hand hole opening fluid tight, there is a short sleeve 59 welded onto the pipe 12. Sleeve 59 has a flange 60 on the outer end thereof to be used in attaching a hatch cover or plate 61.

In conjunction with the hand hole structure there is employed a means for regulating the flow of damper fluid that is caused by the actuation of the cylinder and piston unit 30. This fluid flow regulation is carried out by employing a flexible tubing link 65 that connects one opening 66 from the cylinder of the unit 30, to a restriction-control valve connection 67 that is attached to the plate 61 of the hand hole structure. In the arrangement illustrated, there must also be a loop of fluid piping 68 (schematically indicated in FIG. 5) that joins connection 67 with a similar fluid flow connection 69 which also passes through the hand hole cover 61. Control of these restrictions may be had by incorporating hand controlled valves 72 and 73 as schematically shown in FIGURE 5, that are preferably needle valves for regulating the flow that is passing through flexible tubing 65 and the loop connection 68.

It will be observed that the cylinder of unit 30 has another opening 74 near the other end thereof from opening 66. As would be expected, both openings 66 and 74 are so located as to be beyond the extreme positions of the piston (not shown) in the unit 30. With this arrangement, the action of the damper is hydraulic in nature (assuming that the fluid passing through the valve system is liquid) and makes use of the fluid in the system.

It will be observed that the piston end of the cylinder and piston unit 30 (i.e. that which accommodates a piston rod 75) is attached to the clapper 19 by means of the bracket 31, mentioned above, and in conjunction with another pivot pin 80 that is inserted through holes in the bracket 31 with its penetration determined by a stop collar 81 while the other end of the pin 80 has a transverse hole therethrough to accommodate a cotter pin 82. In this manner the damping unit is directly connected for absorbing the high stresses involved, at close to the center of the moving mass which is creating most of the force that is of concern, i.e. the clapper 19.

It is pointed out that one of the benefits also to be gained in connection with the damping structure according to this invention, is the fact that by mounting the cylinder and piston unit internally of the system, use may be made of the fluid in the system itself as the dampening fluid of the cylinder and piston unit. Thus in the illustrated arrangement the opening 74 of the cylinder directly admits flow of the fluid in the system into the cylinder on one side of the piston within the unit. At the same time the same system fluid is allowed to flow into the cylinder on the other side of the piston, while providing for an adjustable restriction in such flow by means of having one end of the loop 68 open on the underside of the hand hole cover 61 to admit such fluid from the system. The other end of the piping loop 68 is connected via the flexible tubing 65 to the other opening 66 of the cylinder unit 30, while there is included in the fluid circuit of loop 68 and flexible tubing 65 the pair of valves 72 and 73 which may be set to regulate the restriction of fluid flow.

It will be appreciated that, if desired, the damping unit might be designed for providing pneumatic damping; or be designed for a separate hydraulic fluid system if so desired.

It may be noted that the arrangement of a damping element connected to the clapper of a two-way check valve according to this invention, is extremely compact and rugged so that it will have long life and trouble-free action. Furthermore it is to be observed that the supporting structure for the damper unit is adapted to be removable in case dismantling or repair of the system should be required. In addition it may be noted that the arrangement of the elements according to this invention are such that many parts employed may be standard in nature and thus can be purchased on the open market.

While a particular embodiment of the invention has been described in considerable detail in accordance with the applicable statutes, this is not to be taken as in any way limiting the invention but merely as being descriptive thereof.

I claim:

1. In combination, a two-way check valve for use in large quantity fluid flow, said valve having a body with three ports therein, a pivotally mounted clapper for alternatively closing two of said ports, said clapper comprising a body having integrally supported dual faced structure adapted for seating in a closing manner with either of said two ports, and double acting damper means comprising a cylinder and piston located at least partly within the body of said valve, means for pivotally attaching one end of said cylinder and piston to the body of the clapper, and support means located internally relative to said valve for having the other end of said cylinder and piston pivotally attached thereto.

2. The invention according to claim 1 wherein said internal support means comprises a removable sleeve element having means thereon for pivotally supporting said other end of said cylinder and piston, and means associated with one of said ports for clamping and holding said sleeve element.

3. The invention according to claim 2 wherein said cylinder has a restricted opening at each end beyond the extremities of travel of said piston, and further including means for regulating the flow of fluid through one of said openings to adjust the damping effect thereof.

4. The invention according to claim 3 wherein said flow regulating means comprises flexible tubing connected to said one opening, an external restriction control valve connected to the other end of said flexible tubing, and means for completing a fluid path to the interior of said two-way check valve.

5. A two-way check valve comprising in combination a pair of alternatively closed ports, clapper means for closing one of said ports when fluid is entering the other port, pivot means for supporting said clapper, said pivot being offset from the center of mass of said clapper, and double acting damper means comprising a cylinder and piston located immersed in the fluid passing through said valve, said cylinder and piston being effectively attached at one end thereof to said clapper along a line passing substantially through the center of mass of said clapper, and removable internal support means for holding the other end of said cylinder and piston from that attached to said port closing means.

References Cited by the Examiner
UNITED STATES PATENTS

| | | | |
|---|---|---|---|
| 154,390 | 8/74 | Hartman | 137—527.8 |
| 982,400 | 1/11 | Walker | 137—514.5 |
| 1,113,282 | 10/14 | Anderson | 137—514 X |
| 1,442,646 | 1/23 | Butler | 188—88.51 |
| 2,456,566 | 12/48 | Plank | 137—516.25 X |

M. CARY NELSON, *Primary Examiner.*

MARTIN P. SCHWADRON, *Examiner.*